United States Patent
Tewari et al.

(10) Patent No.: US 9,477,734 B2
(45) Date of Patent: Oct. 25, 2016

(54) DATA SYNCH NOTIFICATION USING A NOTIFICATION GATEWAY

(75) Inventors: Ashutosh Tewari, Fremont, CA (US); Gandhi Vaithilingam, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/104,303

(22) Filed: May 10, 2011

(65) Prior Publication Data

US 2012/0290740 A1 Nov. 15, 2012

(51) Int. Cl.
*G06F 15/16* (2006.01)
*G06F 17/30* (2006.01)
*H04W 4/00* (2009.01)
*G06Q 10/10* (2012.01)

(52) U.S. Cl.
CPC ... *G06F 17/30575* (2013.01); *G06F 17/30174* (2013.01); *G06Q 10/107* (2013.01); *G06Q 10/109* (2013.01); *H04W 4/00* (2013.01)

(58) Field of Classification Search
CPC .......................... H04L 12/08693; H04L 67/26
USPC ................................ 709/242, 246, 248, 203
See application file for complete search history.

(56) References Cited

U.S. PATENT DOCUMENTS

| | | | |
|---|---|---|---|
| 6,654,746 B1 | 11/2003 | Wong et al. | |
| 7,324,473 B2 | 1/2008 | Corneille et al. | |
| 2005/0041793 A1* | 2/2005 | Fulton et al. | 379/211.01 |
| 2005/0272452 A1* | 12/2005 | Khoury | G06Q 10/107 455/466 |
| 2006/0171380 A1* | 8/2006 | Chia | 370/352 |
| 2007/0208803 A1 | 9/2007 | Levi et al. | |
| 2008/0040441 A1* | 2/2008 | Maes | 709/207 |
| 2009/0100149 A1* | 4/2009 | Arnold et al. | 709/219 |
| 2009/0307715 A1 | 12/2009 | Santamaria et al. | |
| 2011/0202588 A1* | 8/2011 | Aggarwal et al. | 709/202 |
| 2011/0213898 A1* | 9/2011 | Fiatal | H04L 12/5895 709/248 |
| 2011/0231346 A1* | 9/2011 | Gansner | 706/11 |
| 2011/0252240 A1* | 10/2011 | Freedman et al. | 713/169 |

(Continued)

OTHER PUBLICATIONS

"Multiple MS exchange accounts to 1 device or multiple devices to 1 MS exchange account", Retrieved at <<http://social.technet.microsoft.com/Forums/en/exchangesvrmobility/thread/3790e967-951e-48dc-b651-1feb83a58d08>>,—Retrieved Date: Feb. 21, 2011, pp. 3.
"IGetMailTM Automatic POP3 email downloader for exchange servers", Retrieved at <<http://www.igetmail.com/index.html>>, Retrieved Date: Feb. 21, 2011, p. 1.

(Continued)

*Primary Examiner* — Jason Recek
(74) *Attorney, Agent, or Firm* — Anand Gupta; Tom Wong; Micky Minhas

(57) ABSTRACT

One or more techniques and/or systems are disclosed for facilitating synchronizing of data between one or more servers and a mobile device. The mobile device can establish which servers comprise data that is to be synchronized, and inform the servers that a push notification gateway should be used to send notifications of a data state change. A connection can be opened between the mobile device and the push notification gateway so that when a data state change is detected by a server the server can send the notification to the gateway, which can forward it to the mobile device. The mobile device may then choose to initiate a data synchronization with the server. In this manner, an open connection is merely maintained between the mobile device and the gateway, as opposed to multiple resource intensive connections between the mobile device and multiple servers.

20 Claims, 10 Drawing Sheets

(56) References Cited

U.S. PATENT DOCUMENTS

2012/0011189 A1* 1/2012 Werner et al. ............... 709/202
2012/0079126 A1* 3/2012 Evans et al. ................. 709/230
2012/0117167 A1* 5/2012 Sadja et al. .................. 709/206
2012/0265873 A1* 10/2012 Iund et al. .................... 709/224
2013/0060942 A1* 3/2013 Ansari et al. ................ 709/225

OTHER PUBLICATIONS

Chris, "How to: Increase battery life on your windows mobile Smartphone", Retrieved at <<http://www.wpcentral.com/how-to-increase-battery-life-your-windows-mobile-smarpthone>>, Jan. 2, 2009, pp. 14.

* cited by examiner

US 9,477,734 B2

DATA SYNCH NOTIFICATION USING A NOTIFICATION GATEWAY

BACKGROUND

Data synchronization strives to obtain consistency of data between two or more data storage locations, such as source and target data storage locations. For example, when a state of data is changed in the source data storage location, data synchronization may harmonize the data state change with the target data storage location (e.g., and vice versa). Data synchronization is often used for file synchronization, such as for enterprise-based storage, and mobile device synchronization, such as for exchange server data. Further, data synchronization may occur between a variety of data storage containers, such as blocks of memory, folders, files, storage locations, data bases, and others.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Typically, data synchronization between a mobile device and a server can be initialized from the mobile device. For example, the mobile device can set up the synchronization to harmonize one or more data storage containers (e.g., folders) such that the data stored therein (e.g., contacts, emails, calendar, etc.) can be in a same state (e.g., the same version and/or amount). The set up of the data synchronization can include selecting the desired data storage containers that comprise shared data, and the containers can be synchronized between locations to comprise data in the same state.

When the state of the data changes on the server, the selected data storage containers can be synchronized to reflect the data state change to the mobile device. Currently, however, a connection between the mobile device and server needs to be maintained in an open (hung) condition, so that the server may provide a notification of a data state change to the mobile device. Upon receiving this notification (e.g., fresh data is available to be downloaded to the mobile device), the mobile device can, for example, initiate a data synchronization to maintain an up-to-date synchronization of shared data. However, if the mobile device synchronizes data with a plurality of servers, the mobile device needs to maintain a plurality of open connections (e.g., one per server comprising synchronized data). Maintaining an open connection can be expensive for the mobile device's battery power and computational resources. Maintaining a plurality of connections multiplies the battery power and computational resource use.

Accordingly, one or more techniques and/or systems are disclosed for mitigating the use of a mobile device's battery power and computational resources, for example, by maintaining merely one connection for the mobile device, where the connection may be used to receive data state change notifications from more than one server. A notification gateway or hub may used to receive notifications from registered servers. The notifications can be pushed from the gateway or hub to the mobile device over a connection between the mobile device and the gateway or hub. In this way, for example, for data storage containers comprising shared data between a server and the mobile device, the mobile device can receive data state change notifications from the server while merely maintaining one open connection, even if the mobile device synchronizes data with more than one server.

In one embodiment of synchronizing data between a server and a mobile device, a request can be sent to the server to monitor a data storage container, comprising data shared between the mobile device and the server, for a data state change. Further, a communication channel can be opened to a push notification gateway, such that an open channel may be present to receive a notification. Additionally, a notification can be received from the push notification gateway that the server has detected a data state change for the data storage container, using the open communication channel.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
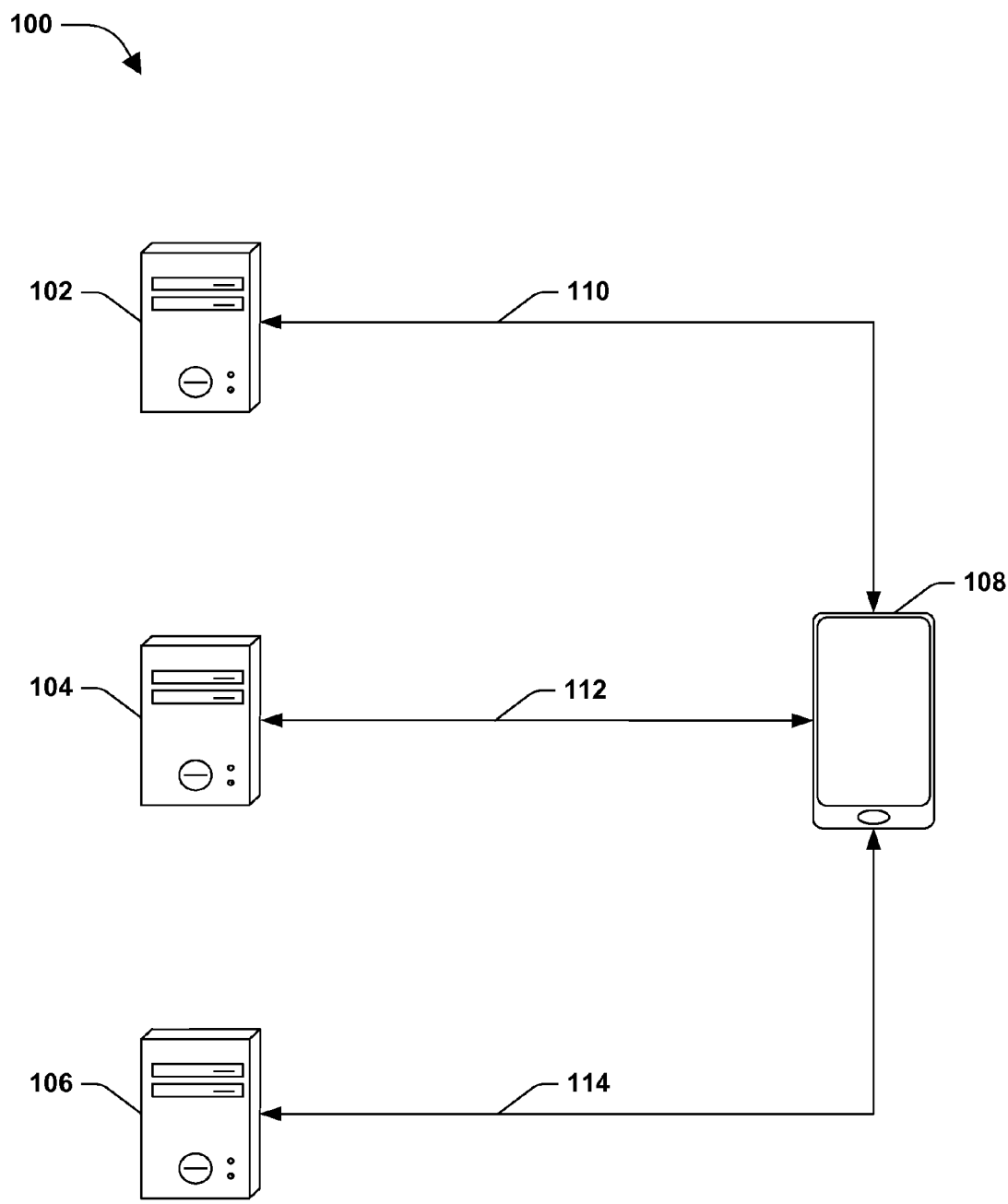
FIG. 1 is a diagram illustrating an example embodiment of a conventional environment where a mobile device may be connected to more than one server.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a diagram illustrating an example embodiment 100 of an existing environment where a mobile device may be connected to more than one server. In this example embodiment 100, the mobile device 108 can have a plurality of connections 110, 112, 114 respectively connected to a remote server 102, 104, 106. As an example, the mobile device 108 may share data with a remote server 102, 104, 106 and use the connections 110, 112, 114 to synchronize (synch) data between the mobile device and a server 102, 104, 106.

For example, the mobile device 108 may share data with a first exchange server 102, a second exchange server 104, and a third exchange server 106. In this example, the user may also connect with the respective exchange servers 102, 104, 106 from an alternate location (e.g., a personal computer, not shown). When the user changes data (e.g., adds a contact to a contact folder, and/or changes a task or calendar event) on the first exchange server 102 from the alternate location, for example, the mobile device 108 can be notified of a needed synch using the appropriate connection 110. It will be appreciated, however, that a user changing data on a server from an alternate location (e.g., personal computer) is merely one example of many ways that a data state change may occur (that ultimately needs to be propagated to/synchronized with the mobile device). In another example, data may change on a server automatically (e.g., programmatically) as processes occur on the server and/or as data is fed to or provided to the server.

Typically, a connection 110, 112, 114 between the mobile device 108 and the remote server 102, 104, 106 needs to be maintained in an open (e.g., hung) state, for example, due to a way in which mobile devices connect with remote servers. In this example embodiment 100, the mobile device 108 may be forced to maintain three open connections 110, 112, 114 in order to receive notifications, as needed. Keeping an open connection can utilize battery power and computing resources on the mobile device 108. As an example, keeping three open connections may utilize three times the amount of battery power and computing resources.

In another embodiment, a mobile application resident on the mobile device 108 may need to frequently poll a corresponding web service resident on a remote server 102, 104, 106 in order to know whether there are any pending notifications. In this embodiment, for example, the respective connections 110, 112, 114 may be used by the mobile device 108 to poll the web service at desired intervals. While effective, continued polling can result in the mobile device's radio being frequently turned on (and off), thereby impacting battery life in a negative way, for example.

As provided herein, a method may be devised that can provide for mitigating use of battery power and computing resources, for example, by utilizing merely one connection to notify a mobile device of a needed synch. For example, multiple remote servers that share data with the mobile device may utilize the one connection to notify the mobile device of a data state change, necessitating a synch event. As an example, the servers may connect to a gateway or hub to which they can send data state change notifications, and the gateway or hub may maintain a connection with the mobile to device, which can be used to forward the notifications.

Figure 2:
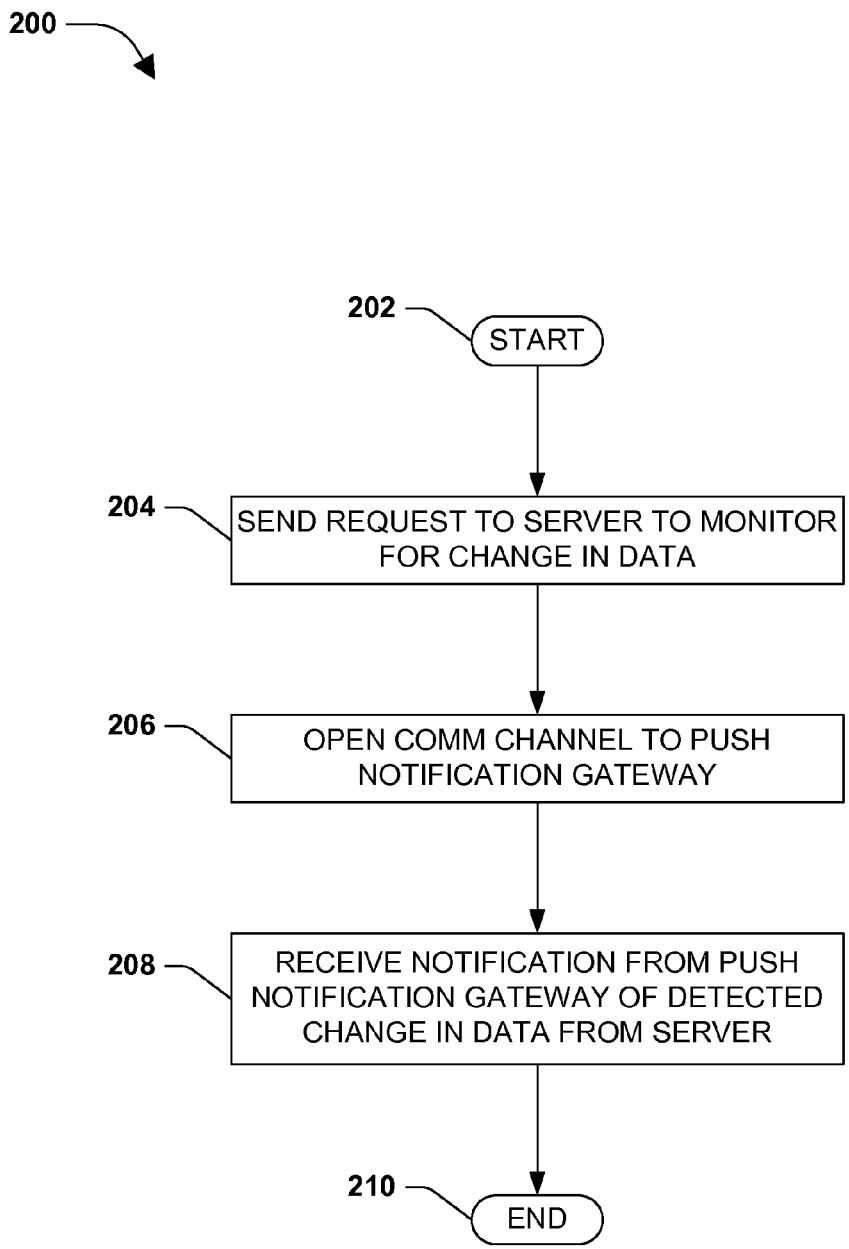
FIG. 2 is a flow diagram illustrating an exemplary method for synchronizing data between a server and a mobile device.

FIG. 2 is a flow diagram illustrating an exemplary method 200 for synchronizing data between a server and a mobile device. The exemplary method 200 begins at 202 and involves sending a request to the server to monitor a data storage container for a data state change, at 204. For example, an exchange server can be used to keep data synchronized with one or more devices. As an illustrative example, if a user adds, changes, or deletes data at a first device (e.g., laptop) the data can be synchronized with the exchange server such that a state of the data is the same at both locations. In turn, the exchange server may synchronize the data with a second device (e.g., smart-phone), such that the state of the data is the same (e.g., same version of a file) at the respective locations (e.g., first device, second device and exchange server). It can be appreciated that, prior to sending the request to monitor for changes at 204, a synchronization relationship may be established with the server so that changes between the server and the mobile device/client can be tracked.

In one embodiment, storage containers (e.g., folders, files, arrays, indexed databases, etc.) that organize the data to be monitored can be identified (e.g., by the user of the mobile device, or automatically by the mobile device). In this embodiment, the storage containers comprising the data to be monitored can be identified in the request to the server from the mobile device, such as by name, location, and/or ID. As an example, the request may comprise the identity of the storage containers, and a desired period of time for monitoring the identified storage containers. As an illustrative example, the mobile device may send a ping request to the server that asks the server to monitor a shared folder "\\mailbox.user\saved emails" for any changes in data state for the next thirty minutes.

At 206 in the exemplary method 200, a communication channel is opened to a push notification gateway. A push notification gateway can comprise a network hub or gateway that pushes a notification from a third party notifier, such as a server, to a mobile device, such as a smart-phone. For example, the third party notifier (e.g., server) may comprise a web-service that sends a notification about a new update that is available for an application resident on the mobile device. In turn, the push notification service may forward the notification to the mobile device, which can display a graphical user interface (GUI) to the user (e.g., as an icon), identifying that the notification has been received. Typically, the mobile device will need to do something with the notification in order to download or view the content associated with the notification, for example.

In one embodiment, opening the communication channel between the server and the push notification gateway can be established by the mobile device. For example, the mobile device can initiate contact with the push notification gateway to open the communication channel. For example, an application resident on the mobile device, such as an application that manages the shared data storage containers (e.g., folders), can open a communication channel with the push notification gateway using the mobile device's radio (e.g., utilizing wireless, cellular, or some other connection). In one embodiment, the communication channel can remain in an open state (e.g., hanging open) so that notifications may be received by the mobile device on an as-needed basis (e.g., upon data state changes).

At 208 in the exemplary method 200, a notification is received from the push notification gateway that the server has detected a data state change for the data storage container (e.g., one of the containers being monitored). For example, the data storage container identified by the request to monitor, at 204, can comprise a folder that is shared by both the server and the mobile device. That is, the folder comprises data that, when synched, is in a same state (e.g., same version) on both the server and the mobile device. In one embodiment, when the state of the data in the monitored data storage container is changed on the server, such as from a remote device (e.g., user's desktop computer), a notification can be received on the mobile device that identifies the data state change.

For example, the server identifies the state change, sends a notification to the push notification gateway, which forwards the notification to the mobile device. In this way, for example, if there are multiple servers, respectively comprising shared data storage containers with the mobile device, they can use the push notification gateway to forward notifications to the mobile device using merely the communication channel between the notification gateway and the mobile device (e.g., instead of the mobile device having a connection to each server). It can be appreciated that, after a change in data is realized, a synchronization operation can be performed so that data is made consistent between the server and the mobile device.

Having received the notification at the mobile device, the exemplary method 200 ends at 210.

Figure 3:
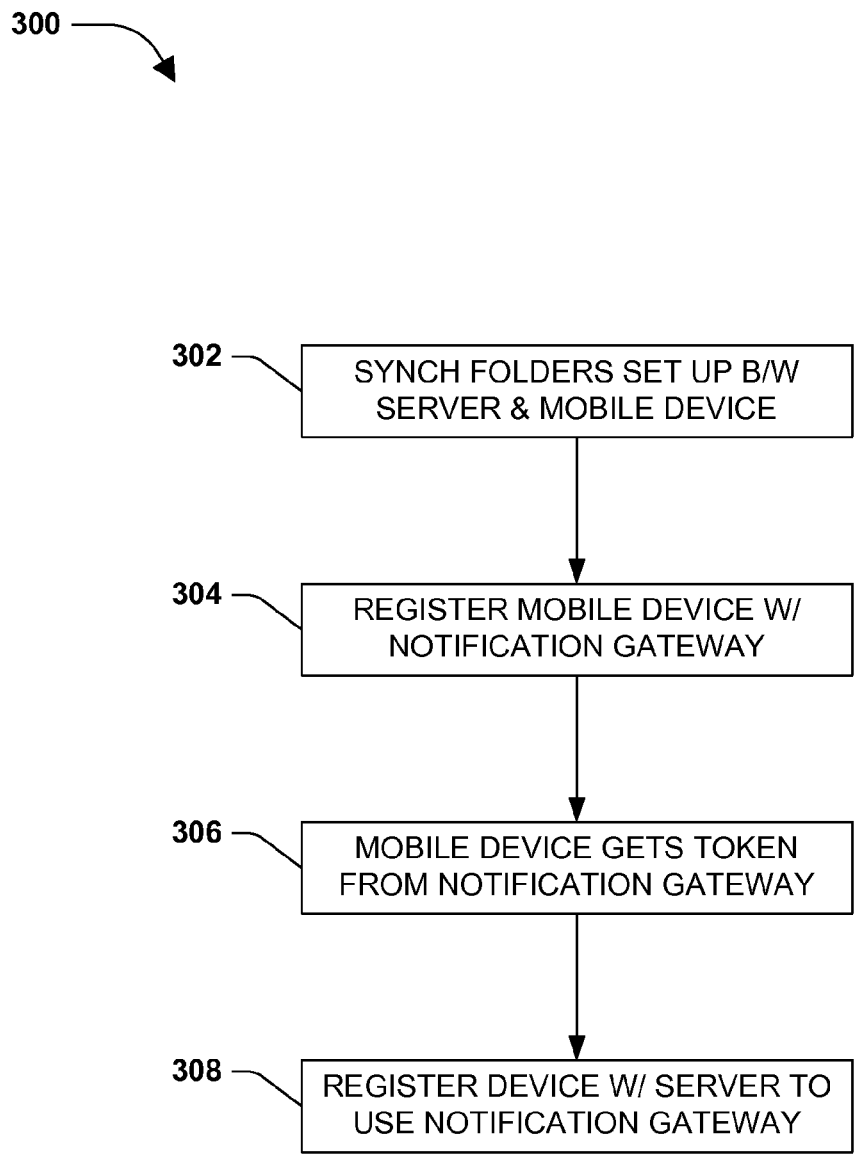
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, synch folders are set up between a mobile device and a server. In one embodiment, the server may comprise a messaging server, such as an exchange server, on which a user has an account. A messaging server account may organize various data for the user, such as emails, calendar-based information (e.g., appointments), contacts, tasks, notes, journal information, and more. In this embodiment, data organized in the respective folders can be synchronized on both the mobile device and the server, such that both locations comprise a same version of the data. It will be appreciated, that data can be synched to additional devices or locations than merely the server and the mobile device, such as a personal computer, additional mobile devices, and/or other server locations, for example.

At 304, the mobile device can be registered with a push notification gateway. For example, the mobile device can communicate with the push notification gateway, such as over a cellular or wireless connection to register itself (e.g., and/or one or more applications resident on the mobile device) with the push notification gateway for receiving notifications (e.g., from one or more servers). In one embodiment, registering the mobile device with the push notification gateway may be performed by sending a notification forwarding request to the push notification gateway, requesting that the push notification gateway forward notifications from the server to the mobile device.

Further, in one embodiment, in response to the request from the mobile device being received at the push notification gateway, the mobile device may receive a mobile device ID, and/or a push notification gateway universal resource identifier (URI) from the push notification gateway. For example, the push notification gateway can generate an ID for the mobile device (e.g., a unique ID), which can be used to specifically identify the mobile device for notifications. Additionally, the push notification gateway may have a URI that can be used to contact the gateway over a network (e.g., the Internet), such as to receive notifications from the server.

At 306, the mobile device can get a token, comprising the mobile device ID and/or the URI, from the push notification gateway. For example, upon registering the mobile device with the push notification gateway, the gateway can return the token to the mobile device. As an illustrative example, an application resident on the mobile device may generate the notification forwarding request that identifies a corresponding remote service, comprising the server (e.g., hosted on the server). The mobile device can send the request to the push notification gateway. In response, in this example, the token can be returned to the mobile device, comprising the mobile device ID and/or the URI.

At 308, the mobile device can be registered with the server to use the push notification gateway for data change notifications (e.g., synch notifications). For example, the mobile device can send a request to the server (e.g., comprising a remote service that is to be monitored for data state changes because that service corresponds to an application resident on the mobile device) to use the push notification gateway for sending data change notifications to the mobile device. In one embodiment, the registering can comprise sending the mobile device ID, and/or the push notification gateway URI. In this way, for example, the server may be able to direct the notification of a data state change to the push notification gateway by using the URI that identifies a location of the push notification gateway (e.g., as a URL). Further, the notification sent to the push notification gateway can comprise the mobile device ID, for example, so that the push notification gateway can forward the notification to the appropriate mobile device (e.g., registered to the mobile ID). It can be appreciated that this can occur with multiple services so that the mobile device does not need to maintain open connections with each of the servers, but merely a single connection, for example, with the push notification gateway. Of course different configurations are envisioned such that zero or more connections (e.g., communication channels) with zero or more servers can also be maintained while also maintaining zero or more connections with the push notification gateway, for example, as may be desired.

Figure 4:
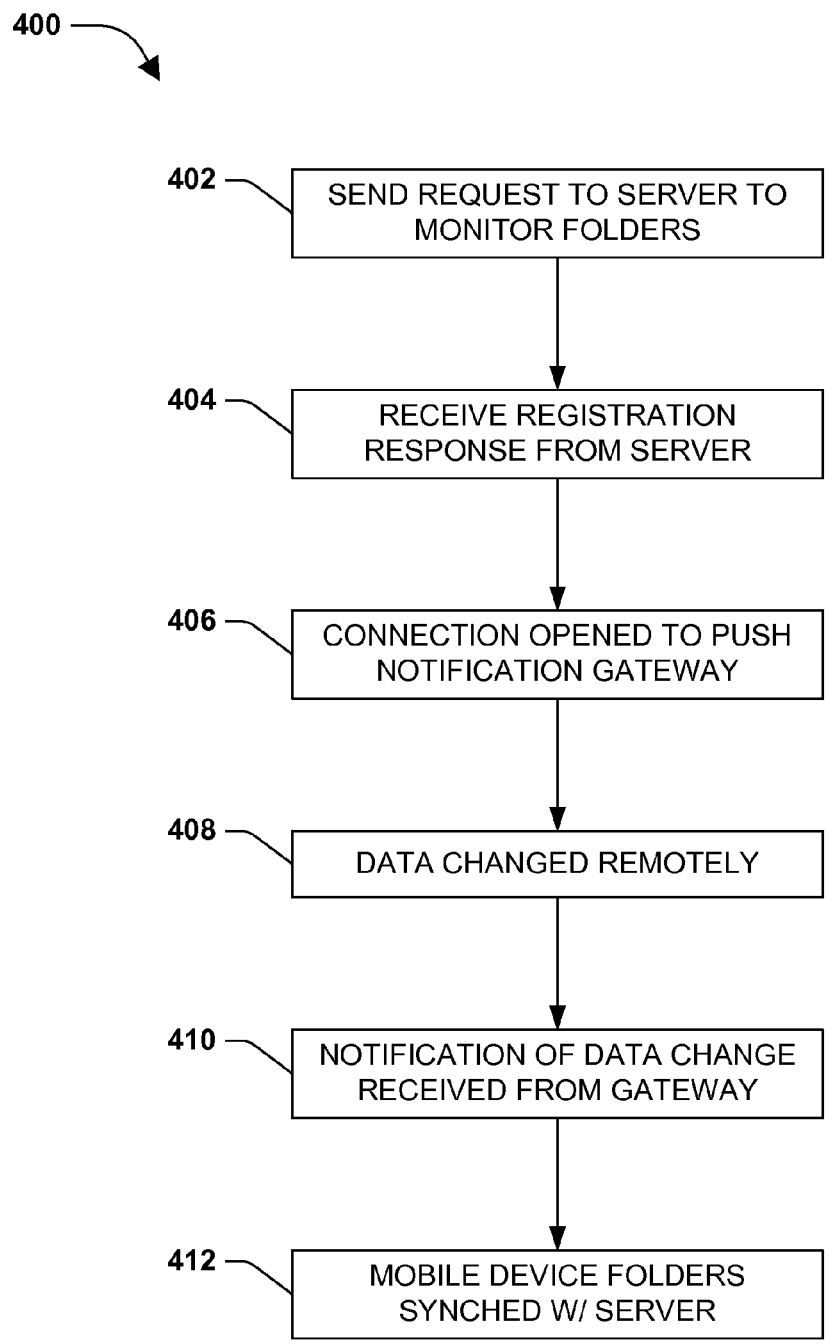
FIG. 4 is a flow diagram illustrating an example embodiment where one or more portions of one or more techniques described herein may be implemented.

FIG. 4 is a flow diagram illustrating an example embodiment 400 of one or more portions of one or more techniques described herein. At 402, a request can be sent from the mobile device to the server to monitor one or more shared (e.g., synched) folders for a data state change. For example, the request to the server may ask the server to monitor one or more of the folders that were previously set up to be synchronized (e.g., at 302 in FIG. 3). In one embodiment, the server may comprise an exchange server that utilizes an exchange active-synch protocol to synchronize data with the mobile device. In one embodiment, the folders requested to be monitored may comprise an email message folder, a calendar folder, a task folder, a journal folder, a contact folder and/or a notes folder, for example.

Further, in one embodiment, the request may comprise a desired time period (e.g., fifteen minutes) for monitoring the one or more data storage containers (e.g., folders). In this embodiment, for example, when the desired time period has expired the server can notify the mobile device (e.g., through the push notification gateway) that no state change has occurred. In this way, for example, the mobile device can receive a type of heart-beat notice to identify that the server is still up and running, and performing the monitoring (e.g., a notice may not be sent if the server goes down). It can be appreciated that if a synchronization relationship is established between the server and the mobile device and/or a subscription is established between a push notification gateway and the mobile device, a request from the mobile device to the server to monitor one or more shared folders for a data state change (e.g., such as at 402) may not be necessary. Accordingly, an action of making such a request may be optional.

Figure 5:
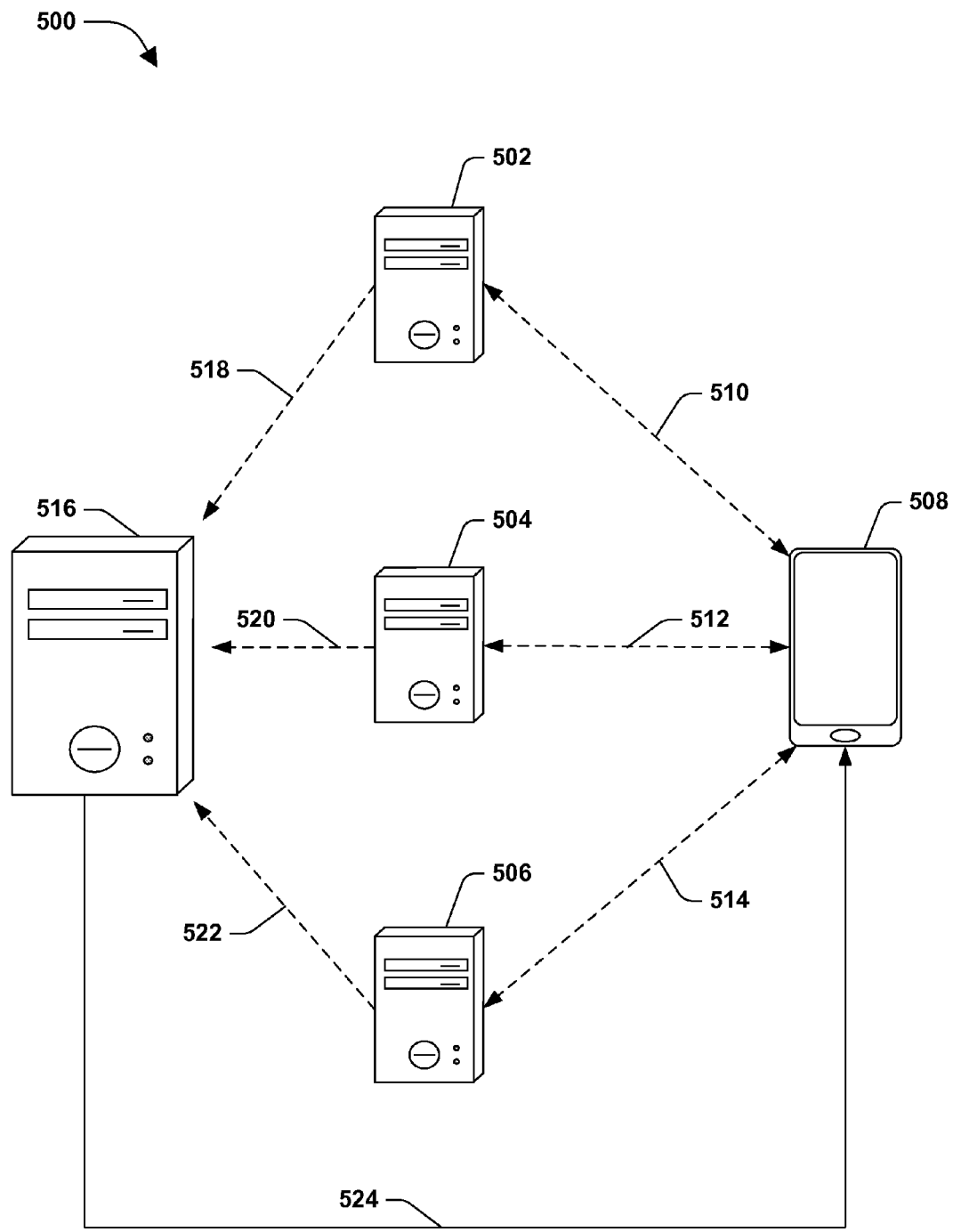
FIG. 5 illustrates an example environment where one or more portions of one or more techniques described herein may be implemented.

As an illustrative example, FIG. 5 illustrates an example environment 500 where one or more portions of one or more techniques described herein may be implemented. In this example environment 500, the mobile device 508 can send the monitoring request over a first connection 510 to a first server 502. Further, the mobile device may have shared folders with a second remote service on a second server 504 and a third remote service on a third remote server 506 (e.g., and a fourth and fifth, etc.). In one embodiment, the mobile device may send a second monitoring request to the second server 504 over a second connection 512; and send a third monitoring request to the third server 504 over a third connection 514.

Returning to FIG. 4, at 404, the mobile device can receive a monitoring registration response from the server. In one embodiment, as illustrated in FIG. 5, the server 502, 504, 506 receiving the monitoring request from the mobile device 508 may respond with a notice of registration to the mobile device 508. For example, the first server 502 can send a response of successful monitoring request registration to the mobile device 508 over the first connection 510. In this embodiment, after the response is received by the mobile device the first connection 510 can be terminated. In another embodiment, the first, second and/or third connections 510, 512, 514 may be terminated after the mobile device 508 sends the request(s) to the server(s) 502, 504, 506. In this embodiment, a connection 510, 512, 514 may be re-established in order for the mobile device 508 to receive the response, for example, after which the connection 510, 512, 514 can (again) be terminated.

In one aspect, a communication channel 524 may need to remain open between the mobile device 508 and a push notification gateway 516. For example, in order to receive timely (e.g., as they occur) notifications of data state changes the mobile device 508 may need to remain connected to the push notification gateway 516. In this aspect, merely the one communication channel 524 between the mobile device and the push notification gateway may remain open to provide the mobile device with notifications (e.g., in contrast to the example 100 of FIG. 1, which needed three connections to remain open).

Returning to FIG. 4, at 406, a connection can be opened between the mobile device and the push notification gateway. For example, the mobile device may communicate with the push notification gateway over a connection (e.g., cellular or wireless), and the push notification gateway may keep the connection open as the communications channel. In one embodiment, opening the communication channel can comprise the push notification gateway keeping the communication channel open from the mobile device upon receiving the notification forwarding request from the mobile device.

For example, as described above in FIG. 3, at 304, the mobile device may send a notification forwarding request to the push notification gateway. In this example, the push notification gateway may maintain the connection used to send the notification forwarding request in an open condition, to be used as the communications channel between the mobile device and the push notification gateway. In this way, for example, forwarded notifications can be sent using the open communication channel when they are received from the server. As an illustrative example, in FIG. 5, a communications channel 524 may comprise an open (e.g., hung) connection between a push notification gateway 516 and the mobile device 508.

Returning to FIG. 4, at 408, a change in a state of the monitored data is detected remotely at the server. For example, a monitored data storage container may comprise changed data, data may be added to the container, and/or data may be deleted from the container. As an illustrative example, a new email may be received by an exchange server and added to a mail folder being monitored. As another example, a user may utilize another device (e.g., PC) to add an item to a monitored data storage container from a remote location. In this embodiment, the server can detect the change in the state of the data in the containers being monitored, for example, per the request from the mobile device.

In one embodiment, upon receiving the request from the mobile device to route data state changes to the mobile device through the push notification gateway, the server can request registration with the push notification gateway. For example, the server may send a registration request to the push notification gateway using the push notification gateway URI provided by the mobile device. In one embodiment, in response to receiving the server registration request, the push notification gateway can provide a server ID, which the server may use (to identify itself) when sending notifications to the push notification gateway. For example, when receiving a notification forwarding request from a server, the push notification gateway may be able to identify the registered server using the server ID. Otherwise, for example, if a forwarding request is received from a non-registered server, the push notification gateway may ignore the request.

In one embodiment, upon detecting the data state change in the monitored data storage container, the server can send a notification of said data state change to the push notification gateway. For example, the notification can comprise an identification of the monitored data storage container comprising the data state change. Further, in one embodiment, the notification can comprise the server ID, and the mobile device ID corresponding to the mobile device. In this way, for example, the push notification gateway can use the server ID to determine that the notification comes from a registered server, and use the mobile ID to identify the appropriate mobile device to which the notification can be forwarded.

As an illustrative example, in FIG. 5, the respective servers 502, 504, 506 can register with the push notification gateway 516 and respectively receive a server ID, which is specific to the server. As an example, the first server 502 may send the registration request over a first remote connection 518, which can comprise a network connection (e.g., over the Internet), by addressing the registration request to the push notification gateway URI provided by the mobile device 508. In response, the push notification gateway can use the first remote connection 518 to return the server ID specific to the first server 502.

Further, as an example, data may be changed on one or more of the servers 502, 504, 506. An affected server can generate a notification, comprising the server ID and mobile device ID, and send it to the push notification gateway over a remote connection 518, 520, 522. In one embodiment, once the notification is sent to the push notification gateway, the connection 518, 520, 522 is terminated (e.g., the notification is a one-way communication lasting as long as necessary to send the notification). Further, the notification is received at the push notification gateway 516 (e.g., routed by the push notification URI), and can be forwarded to the mobile device 508 using the open communications channel 524.

At 410, the notification of the data state change is received from the push notification gateway at the mobile device. In one embodiment, the notification received by the mobile device can comprise notice that data has been changed in one or more exchange-based folder that are shared between an exchange server and the mobile device (e.g., comprising an account linked to the exchange server). In this embodiment, for example, the folders being shared may comprise an email message folder, a calendar folder, a task folder, a journal folder, a contact folder, a notes folder, and/or other folders. When information is updated in these folders on the exchange server, for example, the exchange server can notify the mobile device by routing a synchronization notification through the push notification gateway. In this way, for example, the mobile device may not need to keep an open connection with the exchange server, or with a plurality of exchange servers if the mobile device synchs with more than one exchange server, to receive synch notifications.

At 412 in the example embodiment 400, the mobile device can synchronize the shared folders with the server. In one embodiment, upon receiving the notification from the push notification gateway, the mobile device can initiate an exchange active synch between the server and mobile device. For example, during a sync event, the mobile device and server can compare versions of data organized by the data storage container identified in the notification. As an example, a newest version (e.g., changed version) may be copied (e.g., and overwritten) to the mobile device in the identified data storage container, if the server comprises the newest version. As another example, if data is added or deleted to the identified data storage container, the data may likewise be copied or removed from the synch version on the mobile device. In this way, for example, the data storage containers shared between the mobile device and server can comprise the same versions (e.g., and amount) of data after the synch event.

Figure 6:
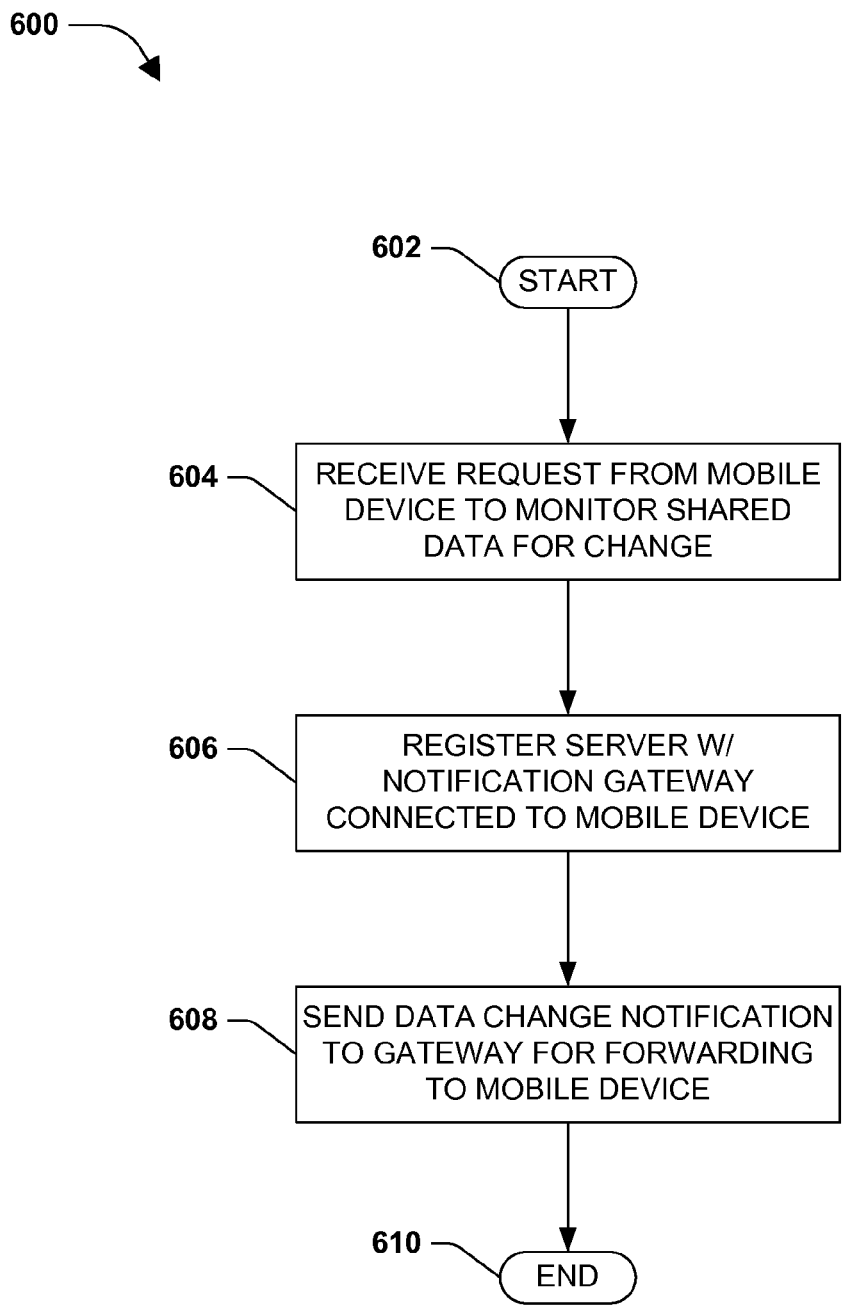
FIG. 6 is a flow diagram illustrating an exemplary method where data can be synchronized between a server and a mobile device.

FIG. 6 is a flow diagram illustrating another exemplary method 600 where data can be synchronized between a server and a mobile device. The exemplary method 600 begins at 602 and involves receiving a request from the mobile device to monitor data shared between the server and the mobile device for a data state change, at 604. For example, the server can comprise data storage containers that are synchronized (e.g., shared) between the server and the mobile device, such that the data in the synchronized containers comprise a same version (e.g., and amount) on both the server and the mobile device (e.g., they share the same information). In one embodiment, the data state change monitoring request from the mobile device asks the server to send a data synch notification to the mobile device, using a push notification gateway, if a data state change is detected at the server. It can be appreciated that, among other things, the mobile device may instruct the server as to which notification gateway the server is to use/register with and send data state change notification/push updates to, that will ultimately be provided/routed to the mobile device via the push notification gateway. It can be appreciated that some type of pre-agreed handshake can be used to operatively connect or couple the server with the push notification gateway and/or the mobile device can explicitly instruct the server as to which push notification gateway the server is to use, such as during the establishment of a synchronization relationship between the server and the mobile device, for example. Moreover, an operative connection or coupling is similarly established between the mobile device and the push notification gateway so that the mobile device is able to receive notifications therefrom (e.g., a notification gateway generally cannot just forward updates to a device without the device "listening" on a specific/established connection, or rather a mobile device will not "accept" such notifications without a subscription being established between the push notification gateway and the mobile device).

At 606, the server registers with the push notification gateway that comprises a communication channel to the mobile device. For example, the mobile device can initiate an open communication channel with the push notification gateway in order to receive data change notifications forwarded from the server. In this embodiment, for example, in order for the server to send notifications to the push notification gateway, it may need to be registered with the gateway. Registering the server with the push notification gateway can provide some security, for example, such that spoofed notifications may be mitigated if sent from non-registered servers.

At 608, upon detecting a data state change in the shared data, at the server, a notification indicating the data state change is sent to the push notification gateway, where the notification is then forwarded to the mobile device from the push notification gateway. For example, the server may receive a data packet that updates a file, deletes a file, and/or adds a file to a monitored data storage container (e.g., from a third-party, or a user of an account that owns the shared data). In this example, the data storage container affected by the data state change can be identified in the notification, and the notification can be sent to the push notification gateway using a URI identifying a location of the gateway. Further, as an example, the push notification gateway can forward the notification to the mobile device.

Having sent the notification to the push notification gateway, the exemplary method 600 ends at 610.

Figure 7:
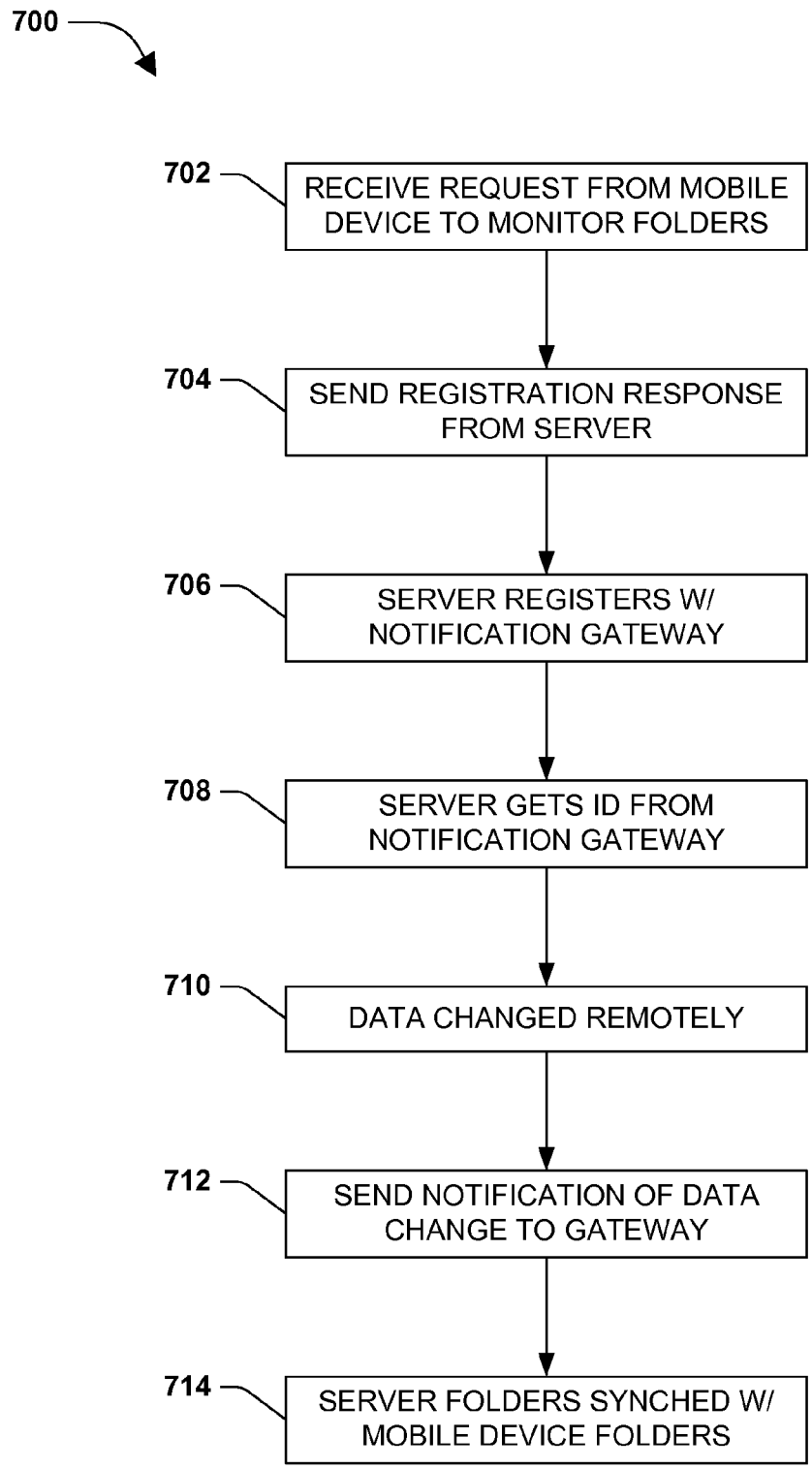
FIG. 7 is a flow diagram illustrating an example embodiment of one or more portions of one or more techniques described herein.

FIG. 7 is a flow diagram illustrating an example embodiment of one or more portions of one or more techniques described herein. At 702 (e.g., after a synchronization relationship is established between the server and the mobile device), a request for monitoring one or more synched data storage containers is received from a mobile device. In one embodiment, the synched data storage containers can comprise exchange-based folders that utilize an exchange active synch protocol to synchronize data. For example, an exchange server may be used as a mailbox server, where mailbox folders can be synched between the server and a mobile device. In one embodiment, the received request can comprise a request to monitor the mailbox folders synched by the exchange server.

In one embodiment, the request from the mobile device may comprise a mobile device ID used to identify the mobile device with a push notification gateway, and/or a push notification gateway URI, used to identify the push notification gateway when sending communications from the server. At 704, in response to receiving the request from the mobile device, a receipt of the request can be sent to the mobile device, for example, upon successful registration of the request with the server. In this embodiment, for example, returning a receipt response to the mobile device may let the mobile device know that the request has been properly received and registered at the server. It can be appreciated that if a synchronization relationship is established between the server and the mobile device so that changes between the server and the mobile device/client can be tracked, receipt of a request from the mobile device to the server to monitor one or more shared folders for a data state change (e.g., such as at 702) may not occur as such a request may not be necessary (e.g., given the synchronization relationship). Accordingly, if such a request is not received, a response to the same (e.g., such as at 704) is thus likewise not necessary. Accordingly, in one example, such receipt and/or sending actions may be optional.

At 706, the server can register with the push notification gateway. For example, the server may utilize the URI sent from the mobile device to send a registration request to the push notification gateway. In response, the server can receive a server ID from the push notification gateway, at 708, which may be used to identify the server when sending notifications to the mobile device through the push notification gateway.

At 710, the data requested to be monitored may be changed on the server, such as from a remote location. For example, the user of an account that manages the synched data storage containers may use another device (e.g., computer linked to the server) to change monitored data in one or more of the data storage containers. In one embodiment, the server can detect the data state change, and generate a notification for the mobile device indicating the same.

At 712, the notification can be sent to the push notification gateway, where the notification can comprise the server ID and a mobile device ID corresponding to the mobile device. For example, the server may send the notification to the push notification gateway using the URI provided by the mobile device. In this example, the notification message comprises the server ID so that the push notification gateway can identify that the notification is coming from a registered server. Further, the mobile ID in the notification message, for example, will help guide the notification to the appropriate mobile device, identified by the mobile device ID.

In one embodiment, the synched data storage containers may comprise folders, such as an email message folder, a calendar folder, a task folder, a journal folder, a contacts folder, and/or a notes folder. In this embodiment, for example, the notification can comprise an indication of the folder that comprises the data state change. For example, if an email is moved from an "inbox" to a "saved emails" folder in the email message folder, the server may identify a data state change in the email message folder, and generate an appropriate notification indicating the data state change.

In one embodiment, upon sending of the notification to the push notification gateway, a connection used for the sending can be closed between the server and the push notification gateway. In this way, for example, an open connection is not maintained. In response to receiving the notification from the server, routed through the push notification gateway, the one or more server data storage containers affected by the data state change can be synched with the corresponding one or more mobile device data storage containers, at 714. For example, the mobile device may initiate a data synchronization upon receiving the notification of the data state change.

A system may be devised that can be used to help synchronize data that is shared between a server and a mobile device, for example, while mitigating use of battery power and computing resources in the mobile device. As an example, where the mobile device may synchronize data with more than one server, notifications about data synchronizations from the more than one servers can be received by the mobile device using merely one connection. More than one server can send notifications to a gateway or hub, which can be used to push the notifications to the mobile device over the one connection, for example.

Figure 8:
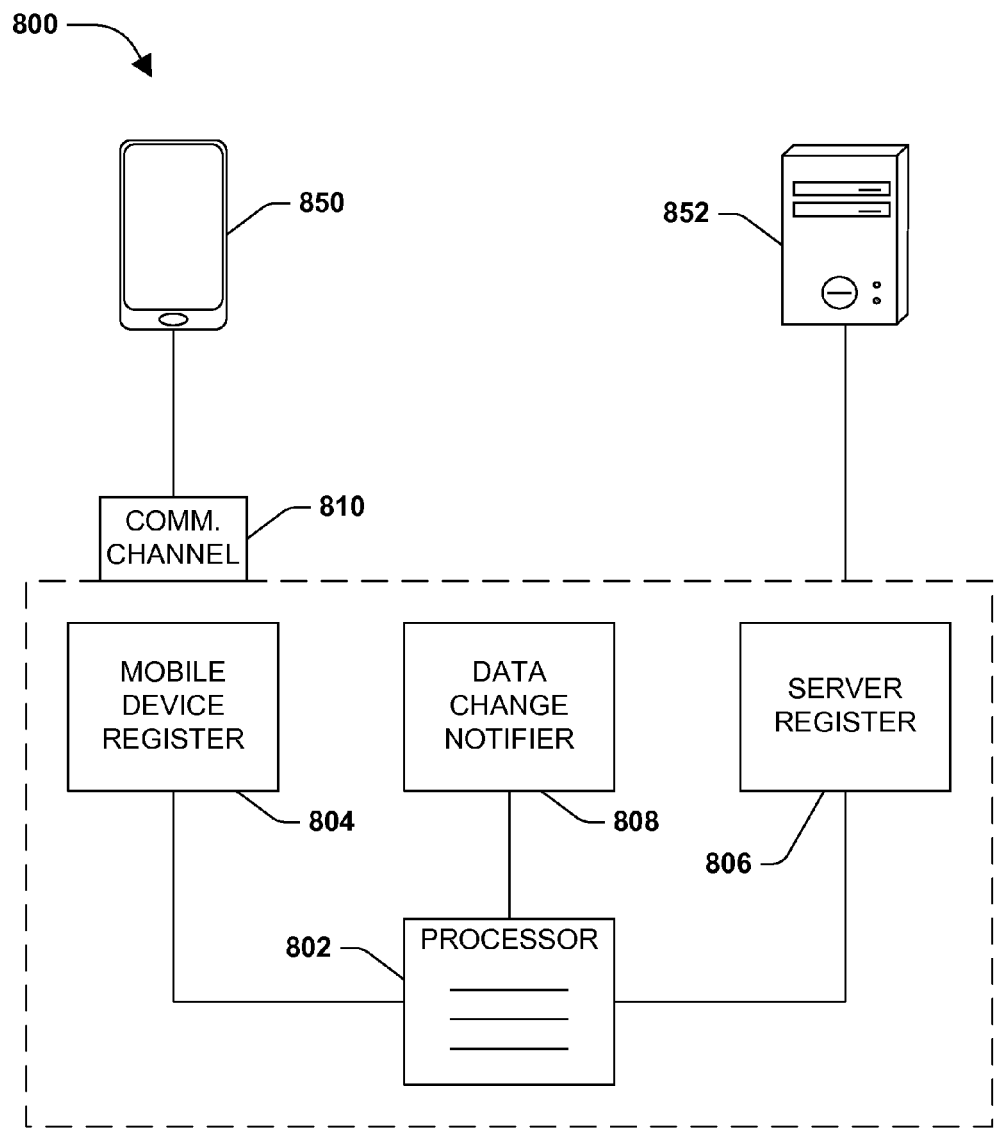
FIG. 8 is a component diagram illustrating an exemplary system for facilitating synchronizing of data between a server and a mobile device.

FIG. 8 is a component diagram illustrating an exemplary system 800 for facilitating synchronizing of data between a server 852 and a mobile device 850. In the exemplary system 800, a computer-based processor 802 is configured to process data for the system, and is operably coupled with a mobile device registration component 804. The mobile device registration component 804 is configured to register the mobile device 850 and provide a mobile device token. For example, the mobile device 850 can connect with the exemplary system 800 to register and, upon registration, the mobile device registration component 804 can provide the mobile device token to the mobile device 850. In one embodiment, the mobile device token can comprise a mobile device ID that identifies the mobile device 850, such as for notifications sent by the server 852 to the exemplary system 800.

In the exemplary system 800, a server registration component 806 is operably coupled with the processor 802, and is configured to register the server 852 and provide a server ID. For example, the server 852 can connect with the exemplary system 800 to register and, upon registration, the server registration component 806 can provide the mobile device token to the server 852. In one embodiment, the server ID can be sent by the server 852 to the exemplary system 800 along with a notification of a data change in shared data between the server 852 and the mobile device 850. In this way, for example, the exemplary system 800 may identify that the notification is received from a registered server.

In the exemplary system 800, a data change notification component 808 is operably coupled with the processor 802. The data change notification component 808 is configured to forward a data change notification to the registered mobile device from the registered server. The notification comprises the server ID and the mobile device token. For example, the mobile device 850 can register with server 852 to send notifications of a change in the state of the shared data using the exemplary system 800, as a push notification gateway or hub.

In this example, as part of the registration of the mobile device with the server, the mobile device can provide the mobile ID (e.g., mobile device token) that was provided to the mobile device by the mobile device registration component 804. Further, in this example, the server 852 can include the mobile device ID and the server ID, provided by the server registration component 806, with the notification of the data state change sent to the exemplary system 800.

In one embodiment, the server 852 can comprise an exchange active synch server. Further, in this embodiment, the notification can comprise a notification of change in data state in a shared folder between the server and the mobile device. For example, an exchange active sync server may share data in folders with the mobile device, such as an email folder, a calendar folder, a task folder, a contacts folder, a journal folder, and a notes folder. As an illustrative example, when a contact is added to the contacts folder on the server 852, a notification of the change in the contacts folder (e.g., adding the contact) can be forwarded to the exemplary system 800, for forwarding to the mobile device 850.

In one embodiment, the exemplary system 800 may comprise a communication channel component 810 that is configured to keep a live communication channel open to the mobile device 850, for example, for sending a notification to the mobile device 850. For example, instead of the mobile device 850 having an open connection to the server 852 (or a plurality of connections to a plurality of servers) to receive notifications of a data state change for shared data, the communication channel component 810 can keep merely the one communication channel open for forwarding notifications from the server (or plurality of servers). In this way, for example, battery power and computing resources may be mitigated on the mobile device, as merely one connection is maintained instead of a plurality of connections.

Figure 9:
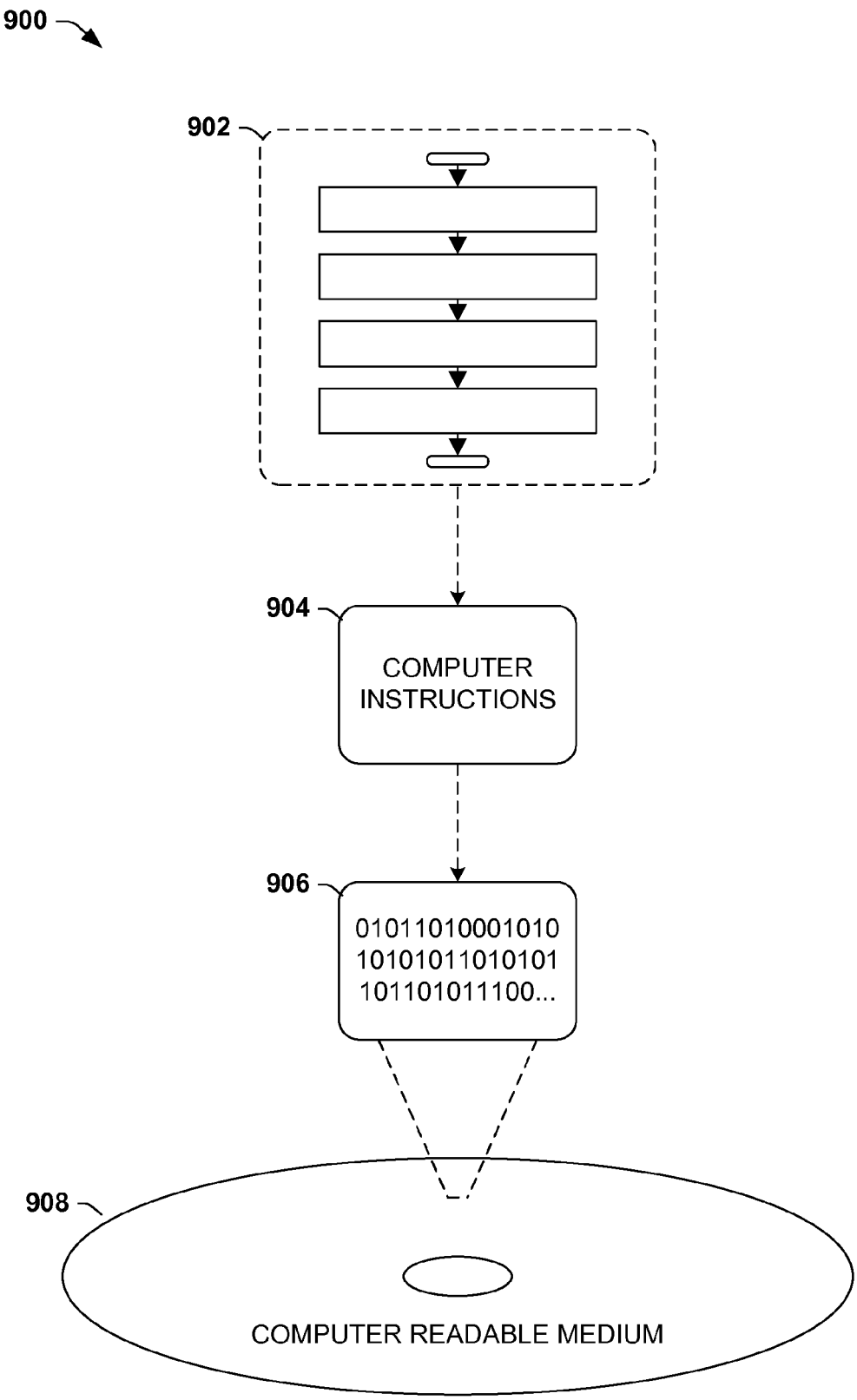
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 200 of FIG. 2, for example. In another such embodiment, the processor-executable instructions 904 may be configured to implement a system, such as at least some of the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
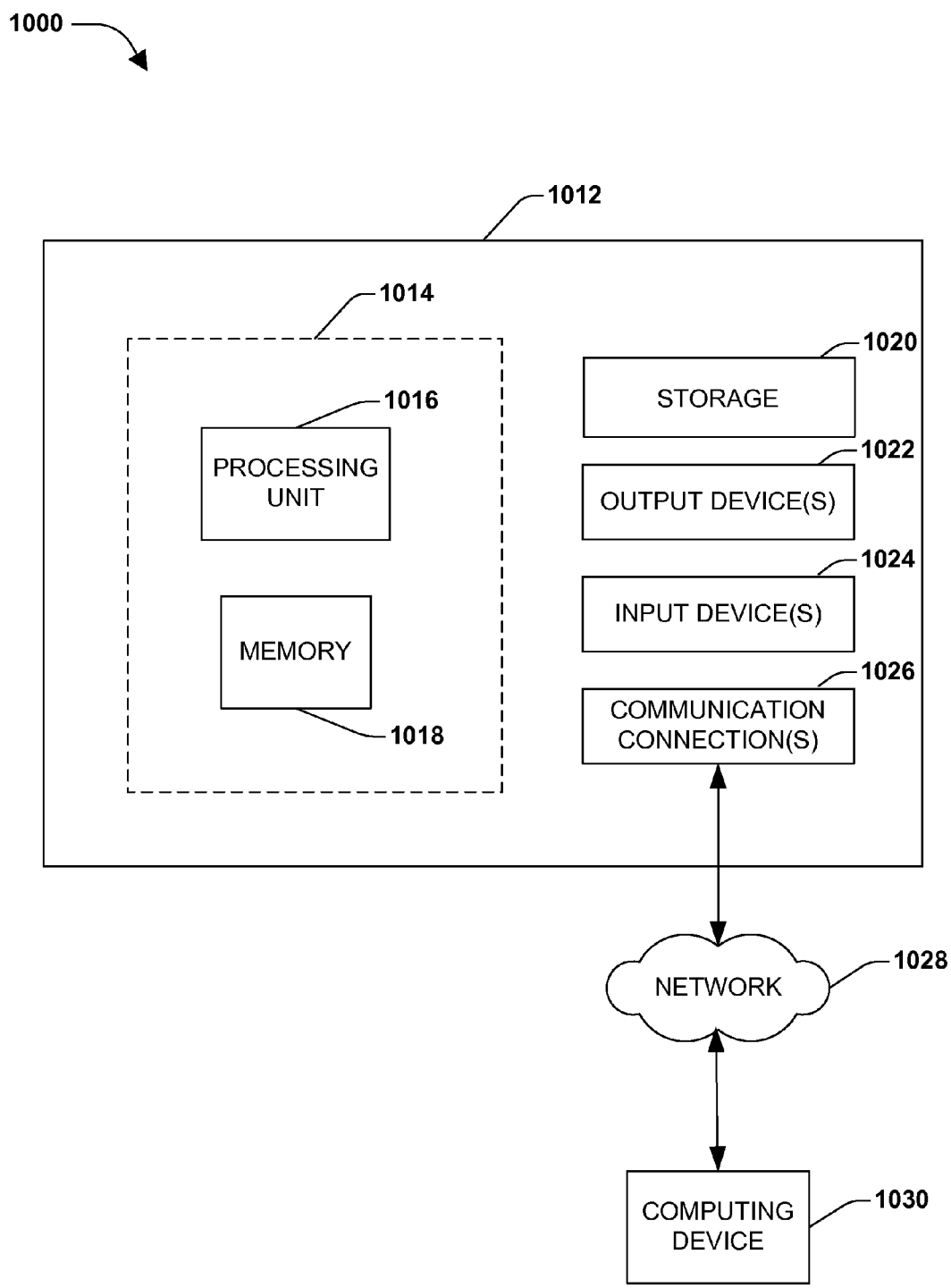
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for facilitating synchronization via a push notification gateway, comprising:
    registering a first server with the push notification gateway based upon a first notification forward request from a device, the first notification forward request being transmitted from the device to the first server via at least one transmission channel that does not include the push notification gateway;
    registering a second server with the push notification gateway based upon a second notification forward request from the device, the second notification forward request being transmitted from the device to the second server via at least one transmission channel that does not include the push notification gateway;
    receiving at the push notification gateway a first notification of a first data state change from the first server;
    responsive to receiving at the push notification gateway the first notification, synchronizing a first portion of the push notification gateway to correspond to the first server;
    receiving at the push notification gateway a second notification of a second data state change from the second server;
    responsive to the receiving a second notification, synchronizing a second portion of the push notification gateway to correspond to the second server; and
    connecting the push notification gateway to the device via a communication channel;
    sending one or more additional notifications, based upon at least one of the first notification or the second notification, from the push notification gateway to the device via the communication channel such that a first portion of the device is synchronized with the first portion of the push notification gateway and a second portion of the device is synchronized with the second portion of the push notification gateway.

2. The method of claim 1, comprising maintaining the communication channel in an open state relative to the device.

3. The method of claim 1, the device comprising a mobile device.

4. The method of claim 1, the one or more additional notifications comprise at least one of a first indication of a first server ID corresponding to the first server or a second indication of a second server ID corresponding to the second server.

5. The method of claim 1, the one or more additional notifications comprise an indication of a device token corresponding to the device.

6. The method of claim 1, wherein the first server comprises a first exchange active synch server, and the second server comprises a second exchange active synch server.

7. The method of claim 1, wherein connecting the push notification gateway to the device via a communication channel comprises:
   connecting the push notification gateway to the device via a communication channel responsive to receiving at least one of the first notification or the second notification at the push notification gateway.

8. A system, comprising: one or more processing units; and memory comprising one or more instructions that when executed by at least one of the one or more processing units, perform operations including at least:
   registering a first server with a push notification gateway based upon a first notification forward request to monitor at least some of the first server for one or more changes to data, the first notification forward request being transmitted from a device to the first server via at least one transmission channel not including the push notification gateway;
   receiving a first notification of a first data state change from the first server, the first data state change made by a second device different than the device;
   responsive to the receiving the first notification, synchronizing a first portion of the push notification gateway to correspond to the first server;
   connecting the push notification gateway to the device via a communication channel; and
   sending one or more additional notifications, based upon the first notification, to the device via the communication channel such that a first portion of the device is synchronized with the first portion of the push notification gateway.

9. The system of claim 8, the method comprising maintaining the communication channel in an open state relative to the device.

10. The system of claim 8, wherein connecting the push notification gateway to the device via a communication channel comprises:
    connecting the push notification gateway to the device via a communication channel responsive to receiving the first notification at the push notification gateway.

11. The system of claim 8, the one or more additional notifications comprise a first indication of a first server ID corresponding to the first server.

12. The system of claim 8, the one or more additional notifications comprise an indication of a device token corresponding to the device.

13. The system of claim 8, the first server comprising an exchange active synch server.

14. The system of claim 8, wherein the operations further comprise:

registering a second server with the push notification gateway based upon a second notification forward request to monitor at least some of the second server for one or more changes to data, the second notification forward request being transmitted from the device to the second server at least one transmission channel not including the push notification gateway;
receiving a second notification of a second data state change from the second server, the second data state change corresponding to a mobile application resident on the device; and
responsive to the receiving a second notification, synchronizing a second portion of the push notification gateway to correspond to the second server;
and wherein sending one or more additional notifications further includes:
sending one or more additional notifications based upon the second notification to the device via the communication channel such that a second portion of the device is synchronized with the second portion of the push notification gateway.

15. A computer readable storage memory comprising one or more instructions that when executed, perform operations comprising:
   registering a first server with a push notification gateway based upon a first notification forward request to monitor at least some of the first server for one or more changes to data, the first notification forward request being transmitted from a device to the first server via at least one transmission channel not including the push notification gateway;
   receiving a first notification of a first data state change from the first server, the first data state change made by a second device different than the device;
   responsive to the receiving the first notification, synchronizing a first portion of the push notification gateway to correspond to the first server;
   connecting the push notification gateway to the device via a communication channel; and
   sending one or more additional notifications, based upon the first notification, to the device via the communication channel such that a first portion of the device is synchronized with the first portion of the push notification gateway.

16. The computer readable storage memory of claim 15, the operations comprising maintaining the communication channel in an open state relative to the device.

17. The computer readable storage memory of claim 15, the device comprising a mobile device.

18. The computer readable storage memory of claim 15, the one or more additional notifications comprising a first indication of a first server ID corresponding to the first server.

19. The computer readable storage memory of claim 15, the one or more additional notifications comprising an indication of a device token corresponding to the device.

20. The computer readable storage memory of claim 15, the first server comprising an exchange active synch sever.

* * * * *